March 8, 1960 F. W. KNOWLES 2,927,443
PLATE FREEZER FOR PACKAGED FOODS
Filed May 23, 1952 6 Sheets-Sheet 4
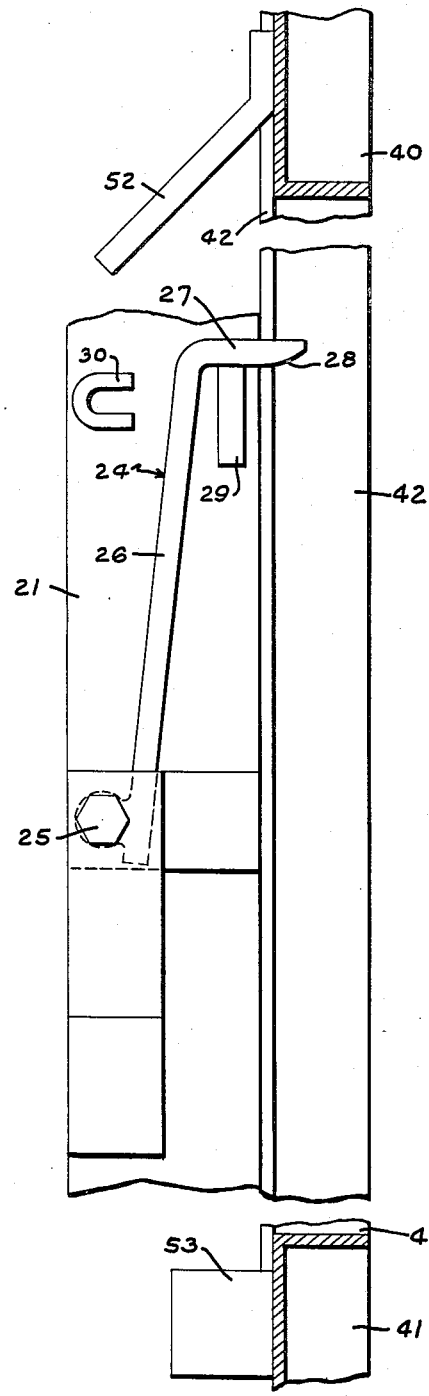
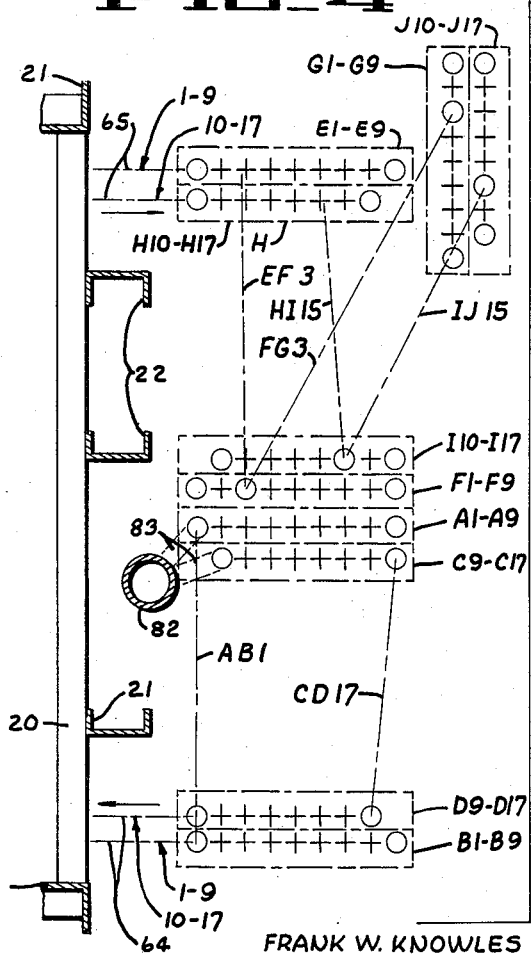
FRANK W. KNOWLES
INVENTOR.
BY Paul Bliven
ATTORNEY March 8, 1960 F. W. KNOWLES 2,927,443
PLATE FREEZER FOR PACKAGED FOODS
Filed May 23, 1952 6 Sheets-Sheet 5
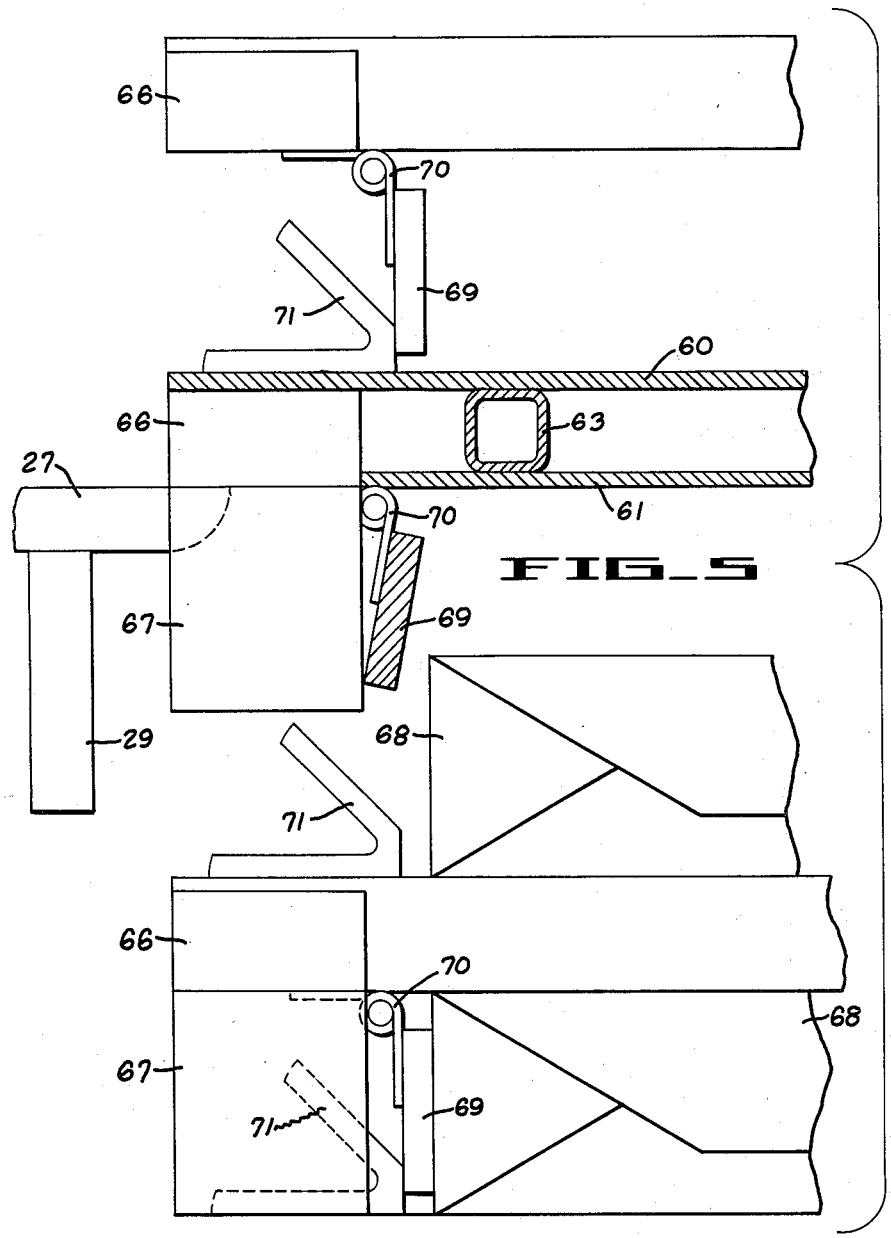
FIG_5
FRANK W. KNOWLES
INVENTOR.
BY Paul Bliven
ATTORNEY March 8, 1960 F. W. KNOWLES 2,927,443
PLATE FREEZER FOR PACKAGED FOODS
Filed May 23, 1952 6 Sheets-Sheet 6
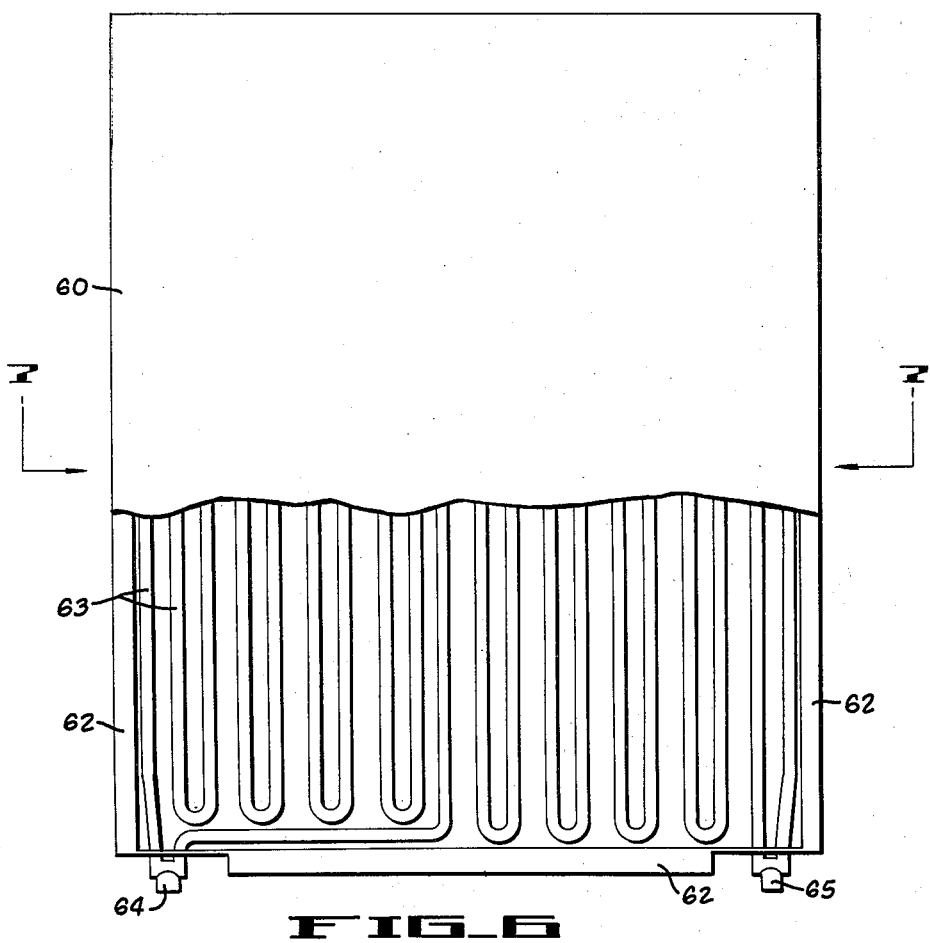
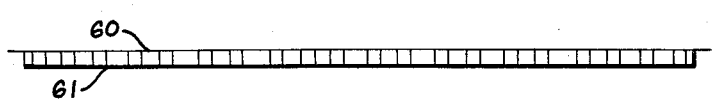
FRANK W. KNOWLES
*INVENTOR.*
BY Paul Bliven
ATTORNEY

United States Patent Office

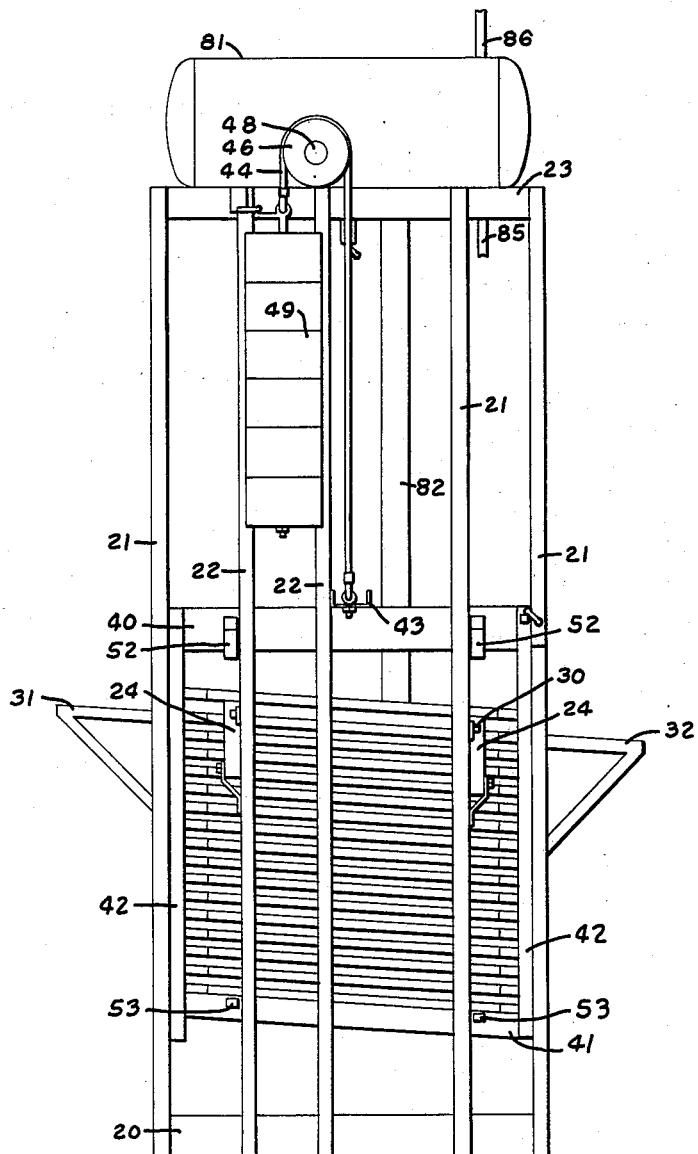

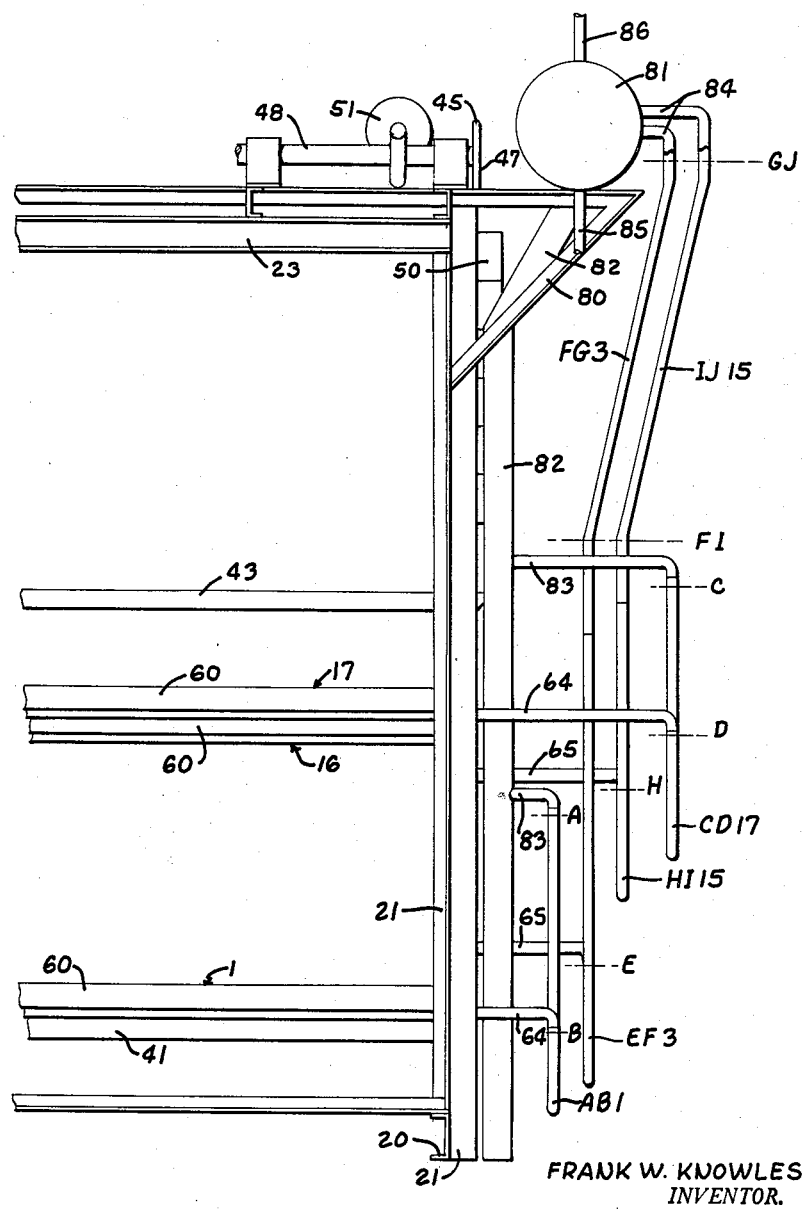

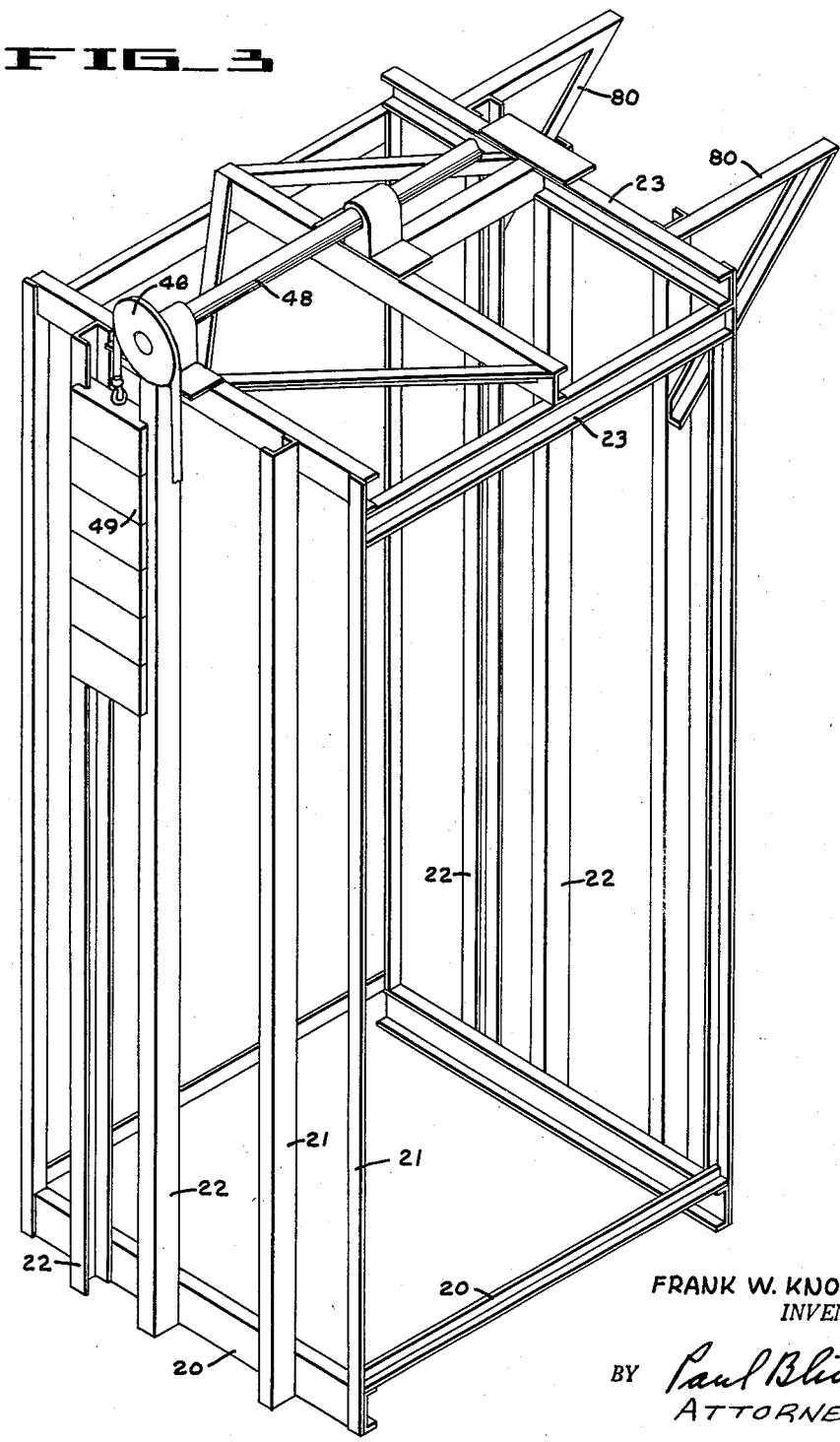

2,927,443
Patented Mar. 8, 1960

2,927,443

PLATE FREEZER FOR PACKAGED FOODS

Frank W. Knowles, King County, Wash., assignor to Belt-Ice Corporation, Seattle, Wash., a corporation of Washington Application May 23, 1952, Serial No. 289,638

17 Claims. (Cl. 62—341)

The present invention relates to multiple plate freezer, and in more particular to a plate freezer for packaged foods which employs a stack of direct expansion refrigerated plates between which packaged foods may be placed for rapid freezing.

There have been many package freezers in the prior art and there have been many employing direct expansion refrigerated plates. The main defect of the prior art devices has been that much labor has been needed to operate them. If the labor required has been reduced, it has required expensive loading and unloading auxiliary equipment as the prior art devices have required loading at several levels.

Therefore, it is an object of the present invention to construct a multiple plate freezer that is simple in design and operation.

It is a further object of the present invention to construct a multiple plate freezer that may be loaded and unloaded at a single level.

A further object is the construction of a multiple plate freezer that may be loaded at one side and unloaded at the side opposite from the loading side.

Another object of the invention is the provision of means for applying pressure to the sides of the packages placed on the trays, and to apply this pressure from the force closing the plates.

Yet another object is to provide simple means for separating the plates for loading and unloading.

A still further object is the provision of a single power, or actuating, means that accomplishes the above objects.

Another object of the invention is the provision of a separate gas return line from each plate to a common receiver to prevent robbing by one plate from others.

While the above objects and the disclosure and description hereinafter set forth relate particularly to a multiple plate freezer, it is believed that the principles of operation and construction embodied in the present invention are applicable to other multiplaten presses.

These objects are achieved and the defects of the prior art remedied by a construction employing a frame in which is mounted a vertically movable cage having therein a stack of refrigeratable plates that have a small amount of possible movement up and down in the cage. The cage is suspended on cables connected to counterweights. A motor drives the cables to raise and lower the cage. A loading station is placed about half-way up the frame, and loading is started between the top two plates. Dogs adjacent the loading station are moved in and out by the movement of plates and cage to support the plates above the station and to allow the plates below the station to move downward with respect to those thereabove. This separates adjacent plates for loading and unloading. An unloading station is arranged on the side of the frame opposite the loading station so that on one opening a plate may be unloaded and loaded without interference between incoming and outgoing packages. Hinged pressure strips are arranged at the sides of the plates and these strips are swung inward against the packages by guides as adjacent plates are brought toward each other. Blocks space the plates apart the proper distance and the weight of the plates constrain the top and bottom surfaces of the packages to this desired spacing.

A flexible hose delivers liquid refrigerant to each plate. A separate hose for each plate conducts the gas to a receiver placed above the plates. This prevents one plate robbing others of refrigerant and maintains a fully wetted surface within the plate.

A construction such as outlined above is shown in detail in the accompanying drawings, in which:

Figure 1 is an elevational view of the right side of the assembled plate freezer.

Figure 2 is a rear elevational view of the left part of the freezer.

Figure 3 is an isometric view of the outer frame and certain other parts thereon, taken with the right rear corner in the foreground.

Figure 4 is a schematic plan view which indicates the piping layout.

Figure 5 is an elevational view, partly in section, showing details of the construction of the plates and associated parts.

Figure 6 is a plan view of one of the plates.

Figure 7 is a sectional view on the line 7—7 of Figure 6.

Figure 8 is a detail view showing one of the dogs and its coacting cams, used for separating and holding adjacent plates apart.

Figure 1 is an elevational view of the right side of the assembled plate freezer embodying the present invention. In this and other views there is shown a series of refrigeratable plates 1 to 17, inclusive, which are arranged flat and one above the other in a stack, that is, the plates are face to face and superimposed. Hereinafter, certain pipe and hose connections to these plates are designated by the use of the plate number with a letter prefix. The plates are numbered from the bottom plate to the top plate of the stack. The stack has up and down movement in a cage and the cage has up and down movement in a frame. The frame comprises base members 20 to which are attached upright side members 21. The front and back of the frame are left free of uprights so that there will be no hinderance to loading and unloading as packages are passed thru from front to back. Certain of the uprights form guides 22 for the cage counterweights. The upper ends of the side members are caped with and tied together by a top made up of structural members 23, as are the sides and base.

Pivoted to the frame a short distance below the middle are four dogs 24, two on the right side and opposite these on the left side are the other two. The two on the left side are not shown but operate in the same manner and for the same purpose as the right side dogs. Figure 8 is a detail of one of these dogs and coacting parts. Each dog is pivoted at its lower end on a stud 25, secured in one of the uprights of the frame, and the dogs may swing in toward the plates. In the inward position of the dog its shank 26 extends upward from its pivot and inward toward the plates. A nose or finger 27 on the dog is bent downward from the shank and extends further inward and may have an outwardly convex underside 28. The under side of the nose adjacent the shank rests on a stop 29 secured to the frame, when the dog is in its inward position. A permanent magnet 30 is attached to the frame adjacent each dog so that when the dog is fully retracted outward it will rest against its magnet and be held thereby. The weight alone of the dog holds it in its inward position. The means for moving the dogs inward and outward will be hereinafter described in connection with the description of the cage and plates.

Across the front of the frame and a few inches below the noses of the dogs near the front of the frame is placed a loading table or shelf 31. An unloading table or shelf 32, is placed across the back of the frame a few inches below the noses of the dogs near the back of the frame.

The cake is composed of top 40 and bottom 41 members and side 42 members which are arranged to slide up and down inside the frame side members and be guided thereby. The cage has a top bar 43 medially thereacross to each end of which is secured a separate cable 44, 45 that passes upward and over a sheave 46, 47. These sheaves are mounted one on each end of a shaft 48 extending across the top of the frame. After passing over its sheave, each cable extends downward and has secured to this other end a counterweight 49, 50. These counterweights are guided by the frame members 22. On the top of the frame is secured a gear-head reversing motor 51 that rotatably drives the shaft to raise and lower the cage and counterweights.

In the detail view of Figure 8, there is shown means for moving the dogs inwardly when the cage is moved to its bottom position and outwardly when moved to its top position. Secured to each side top member 40 of the cage and in the path of each dog is a top cam 52 which has an angular shape so that the arm, or finger, of the cam will contact the outside of the dog as the cage moves to its bottom position and move the dog inward to rest on its stop bar 29. Secured to each bottom side member of the cage in the path of a dog is a bottom dog-cam 53 that will contact the inside face of the dog and swing it outward against its permanent magnet 30.

Inside of the cage and free to move up and down therein are a stack of refrigeratable plates, 1 to 17, inclusive. Each plate is formed with a top sheet 60 and a bottom sheet 61. The sheets are spaced apart by marginally placed angle irons 62 that form a marginal flange in the plane of the top sheet. Between the sheets are placed square pipe coils 63. Connection nipples for the coils are along the left hand edge, the inlet 64 being near the back and the outlet 65 near the front. Each whole plate unit is sealed by hot dip galvanizing or by other means. It is to be noted that the plates are slanted slightly from front to back at an angle to the horizontal and the straight portions of the coils 63 extend from side to side. All this is to give the refrigerant gases an upward path of travel and to prevent trapping of gas in the coils. The slant is obtained by blocking the front edge of the bottom plate of the stack, higher in the cage than the back edge.

Along each right and left side edge and in the angle of the marginal angle iron 62 is placed a filler bar 66. This bar reinforces the side edges for contact with the noses 27 of the support dogs 24 and for support of a plate and the plates resting on it from above. Each plate is provided adjacent each corner and at the side edge thereof with a spacing block 67 which is secured to the underside of the filler bar. These blocks are of a height dependent upon the size of the packages, or cartons, 68 to be frozen, and are such that the packages will not bulge on their top or bottom sides when frozen and if the spacing blocks remain in contact with the top of the plate under the one to which the blocks are secured. This they do, so that the packages are frozen without bulges.

Another factor in obtaining squarely frozen packages is the use of a pressure strip 69 along edges of each plate. Generally, pressure strips are not used on the front and back edges of the plates. Each pressure strip 69 is hinged to the under side of a plate adjacent to and parallel to the edges thereof. The hinges 70 for the strips are sufficiently outside so that the weight center of the strips causes them to swing outward when hanging free from their hinge. When adjacent plates are brought together, guides 71 placed on the upper surface of each plate at each side edge and having upper surfaces sloping inwardly and downwardly force the pressure strips to swing inward by wedging contact of the lower edges of such strips with such sloping guide surfaces. Such inward movement of the pressure strips lines up and brings together packages which are on the plates.

As the cage moves into its bottom position and each top dog cam 52 moves its dog 24 inward, the nose of each dog will be above the top face of the top plate 17. Movement of the stack upward will then contact opposite edges of the top plate against the convex underside portion 28 of nose 27 of each dog 24 and move the dog outwardly enough so that the edges of the plate will pass the dogs. The dogs do not move outward far enough to contact the magnets 30. When the edges of the plate 17 have moved past the noses of the dogs, the dogs will fall back against their stops 29 and the dog noses 27 will lie under the corresponding plate edges. Now, lowering of the cage and its stack of plates will bring the full weight of the top plate on the dogs and as the cage and other plates move further downward the top plate will be separated from its adjacent next lower plate 16. A layer of cartons 68 containing material to be frozen may then be placed on the upper face of the next plate 16 to the top plate 17 by moving such cartons from the loading table 31 to the plate.

When the top opening has been loaded, the cage is raised, the edges of the second plate 16 from the top engage under the noses 27 of the dogs 24 to swing them outwardly again enough for the plate 16 to pass the dog noses. The dogs then swing, or fall by gravity, inwardly between the second plate 16 and third plate 15 which allows unloading and loading of packages from between the second and third plates. This operation is then repeated for each plate until a load has been placed between all adjacent plates, including the bottom two plates 2 and 1. Then the cage is raised to its highest position which brings the bottom cams 53 against the dogs 24 and moves them outward against their magnets 30. The cage may then be lowered while the dogs are held out of the path of the plates by such magnets until the top cams 52 engage the dogs and force them inward again away from their magnets. In its lowest position, the weight of the cage may be carried on the dogs either thru the top cams or by the side members of the cage top engaging the noses of the cams. It is to be noted that the front dogs are higher than the rear pair to maintain the slope of the plates. The cage may rest in this position until the packages are frozen. Further slight raising and then lowering of the cage will again separate the top two plates as described above. The frozen packages 68 are then removed by moving them out the back of the stack onto the unloading table 32 and new unfrozen ones inserted in the front from the loading table 31. These tables are so placed that their top surfaces aline with the top surface of a tray when two adjacent plates have been separated for loading and unloading.

Any suitable controlling or switching means may be used for actuating the gear head motor 51 to obtain the above desired movement of the cage and its stack of plates.

At the top of the frame on the left side, and mounted on outboard brackets 80 is a header tank 81 for refrigerant. Liquid refrigerant is supplied from the tank to the plates thru a stand pipe 82 connected to the bottom of the tank and extending below the tank to near the bottom of the frame. Nipples 83 are placed in the stand pipe at various levels, one nipple for each plate. A flexible hose such as AB1, CD17 is connected to each of these nipples and each hose extends to the inlet nipple 64 at the back, lower, corner of a plate.

Placed directly in the side of the tank above the liquid level are a series of tank return, or gas, line nipples 84. Each of these is connected to the outlet nipple at the front left corner of a plate by piping such as FG3, IJ15, and such as EF3, HI15.

The layout of the connections and flexible hoses is best understood from the drawings. It is such that the plates and cage may move up and down in the frame and the plates may move up and down in the cage, freely and without tangling, straining, or kinking of the hoses. By this arrangement, liquid refrigerant is supplied to each plate and the gas removed therefrom without vapor locking and without one plate robbing another. Refrigerant is supplied to each plate as needed.

Figure 4 is a schematic showing of the pipe and hose layout for the conduction of refrigerant to and from the plates. Each box A to J, inclusive, designates a group of pipe connections that have a common grouping. Each pipe section is not necessarily at the same level. More of the details of piping are shown in Figure 2 which is a rear elevational view of the left side of the freezer. Liquid refrigerant flows from the tank 81 down thru the stand pipe 82 and out thru the stand pipe nipples 83 which are spaced one above the other along the stand pipe. An upper group of stand pipe nipples for plates 1 to 9, inclusive, is connected to A and a lower group of nipples for plates 10 to 17, inclusive, is connected to C. The connections at A are connected to group B by flexible hoses and each connection in B leads to the inlet nipple 64 of a plate, in particular, plates 1 to 9, inclusive, from bottom to top of the stack. The connections at C lead thru hoses to D and from D to the inlet nipples 64 of plates 10 to 17, inclusive. The center line of the inlet hose AB1 from its connection A1 to B1 has been indicated. The elevation is shown in Figure 2. Also, shown in Figure 4 is the center line for the hose CD17 which is shown in elevation in Figure 2. The hoses AB will hang below hoses CD.

The outlet nipples 65 for plates 1 to 9, inclusive, are extended to and grouped at E. Flexible hoses connect E to F. The outlet nipples 65 for plates 10 to 17, inclusive, are extended to and grouped at H. From H by hose the connections pass to I. Pipes connect F to G and I to J. From G and J the pipes pass into the tank 81 at the side thereof and near the top thru nipples 84. The hoses EF will hang below those of HI. Pipes FG form a curved bank parallel to those of IJ. The center lines of hose connections for the outlets of plates 3 and 15 are shown at EF3 and HI15. The corresponding pipes from I to J and F to G are shown at FG3 and IJ15.

The tank is supplied with liquid refrigerant, such as ammonia, from the high side of a refrigeration system thru a refrigerant supply pipe 85, and gas is removed from the top of the tank by a connection 86 to the low side of such refrigeration system. Such system is not shown other than by these connections thereto.

In the operation of this multiple plate freezer, refrigerant is supplied to the tank to maintain the liquid level about half way up therein, and to fill the connections and plates. Loading may start on any plate but usually the next to the top plate is loaded first and the others downward in series. Also, frozen packages are pushed off the plates by the incoming packages.

Having thus described my invention, I claim:

1. In a plate freezer, an upright frame, a plate cage supported in said frame and guided thereby for bodily raising and lowering movement, a stack of refrigeratable plates in said cage, loading means disposed generally centrally between the top and bottom of said frame, and means for moving said cage up or down in said frame to shift the sapces between said plates successively past said loading means comprising: a shaft bearinged on the upper portion of said frame and extending across said frame, a sheave carried on said shaft at each side of said frame, power means for rotating said shaft, a rope rove over each sheave, each rope connected at one end to said cage, and a counterweight connected to the other end of each rope.

2. Refrigerating apparatus comprising a stack of substantially parallel superimposed refrigeratable plates, means defining a fixed loading station adjacent to said stack of plates from which articles can be fed between two adjacent ones of said plates, means operable to move vertically conjointly as a unit plates of said stack both above and below said loading station equal distances and in the same direction and to move said plates progressively past said loading station, and means at said loading station operable to space two adjacent plates in registry with said loading station farther apart than plates above and below said loading station which are adjacent for facilitating movement of articles from said loading station into the space between plates at such loading station.

3. Refrigerating apparatus comprising a stack of substantially parallel superimposed refrigeratable plates, a fixed loading station adjacent to said stack of plates from which articles can be fed between two adjacent ones of said plates, supporting means supportingly engaging the lowermost plate on said stack of plates and movable vertically to move said plates progressively past said loading station, and means independent of said supporting means, engageable with one of said plates in registry with said loading station and operable to effect relative movement of such plate and said supporting means to increase the spacing between such plate and an adjacent plate for facilitating movement of the articles from such loading station into the increased space between such plates.

4. Refrigerating apparatus comprising a stack of substantially parallel superimposed refrigeratable plates, a fixed loading station adjacent to one side of said stack of plates from which articles can be fed between two adjacent ones of said plates, a fixed unloading station adjacent to the opposite side of said stack of plates, means operable to move vertically conjointly as a unit plates of said stack both above and below said loading station and said unloading station equal distances and in the same direction and to move said plates progressively past both said loading station and said unloading station, and means at said loading station and said unloading station operable to effect increase of the spacing between adjacent plates in registry with said loading station and said unloading station for facilitating loading of articles from said loading station between plates of the stack and removal of articles to said unloading station from between plates of the stack.

5. A plate freezer comprising a stack of substantially parallel superimposed refrigeratable plates, stationary upright guide means guiding said plates for vertical movement, a loading station disposed a substantial distance above the bottom of said guide means, supporting means supportingly engaging the lowermost plate of said stack and movable to shift plates of said stack guided by said guide means past said loading station, and means at said loading station carried by said guide means and operable to increase the spacing between two adjacent plates for facilitating reception of articles between such plates from said loading station.

6. The plate freezer defined in claim 5, the means at the loading station arresting movement of one of two adjacent plates in registry with the loading station while the supporting means effects movement of an adjacent plate away from such arrested plate.

7. Refrigerating apparatus comprising a stack of superimposed refrigeratable plates, a fixed loading station adjacent to said plate stack, first supporting means disposed at said loading station and operable to support all the plates of said stack above said loading station, and movable second supporting means operable to move plates of said stack between positions above said loading station and positions below said loading station and to support all the plates of said stack below said loading station.

8. Refrigerating apparatus comprising a stack of superimposed refrigeratable plates, a fixed loading station adjacent to said plate stack, movable supporting means operable to move plates of said stack between positions above said loading station and positions below said loading station and to support all the plates of said stack below said loading station, and a dog disposed at said loading station and movable between a position supporting all the plates of said stack above said loading station and a position retracted from the path of movement of plates of said stack effected by said movable supporting means.

9. The refrigerating apparatus defined in claim 8, pivot means supporting the dog for swinging, the dog being shaped and mounted for wedging engagement by an upwardly moving plate to swing it about said pivot means toward retracted position to enable such plate to move up past the dog, holding means operable to hold the dog in retracted position out of the path of movement of the plates of such stack, and cam means operable by movement of the stack of plates into its uppermost position to engage said holding means and the dog to hold the dog in such retracted position.

10. In a plate freezer, two superimposed refrigeratable plates, means supporting said plates for approach movement, a strip adjacent to corresponding edges of said plates, means supporting said strip from one of said plates for movement toward and away from such edges of said plates, and means carried by the other of said plates and operable by approach movement of said plates to effect movement of said strip away from the adjacent edges of said plates.

11. Refrigerating apparatus comprising an enclosing structure, a vertical stack of relatively separable refrigerated plates therein providing a series of freezing stations one between each two successive plates of the stack, said enclosing structure having a substantially horizontal passage by which said stations can be loaded individually at the same level, means for vertically raising and lowering said stack whereby the two plates of any station can be brought into loading position adjacent said passage, and means operable to spread the plates of the station at such loading position to receive therebetween products to be frozen while the plates of other stations are held against movement relative to each other.

12. Refrigerating apparatus comprising an enclosing structure, a vertical stack of relatively separable refrigerated plates therein providing a series of freezing stations one between each two successive plates of the stack, said enclosing structure having a substantially horizontal passage by which said stations can be loaded individually at the same level, means for vertically raising and lowering said stack whereby the two plates of any station can be brought into loading position adjacent said passage, and means operable to hold one plate of any station at such passage while the other plate thereof is moved relative to such held plate to cause relative separation of the plates of such station to receive therebetween products to be frozen.

13. Refrigerating apparatus comprising an enclosing structure, a vertical stack of relatively separable refrigerated plates therein providing a series of freezing stations one between each two successive plates of the stack, said enclosing structure having a substantially horizontal passage by which said stations can be loaded individually at the same level, means for vertically raising and lowering said stack whereby the two plates of any station can be brought into loading position adjacent said passage, and stop means engageable with an individual plate of the pair of plates adjacent said passage for arresting the movement of one plate of any station while the other plate thereof is moved by said first named means to cause relative separation of the plates of a station, thereby opening said station for loading products to be frozen into such station.

14. Refrigerating apparatus comprising an enclosing structure, a vertical stack of relatively separable refrigerated plates therein providing a series of freezing stations one between each two successive plates of the stack, said enclosing structure having a substantially horizontal passage by which said stations can be loaded individually at the same level, means for vertically raising and lowering said stack to bring the lower plate of each station into loading position adjacent said passage, and plate supporting means engageable with individual plates of the stack for supporting the upper plate of each station at a point above said loading position for supporting all of the plates of the stack thereabove whereby each two successive plates can be separated for loading the freezing station therebetween.

15. Refrigerating apparatus comprising an enclosing structure, a vertical stack of relatively separable refrigerated plates therein providing a series of freezing stations one between each two successive plates of the stack, said enclosing structure having a substantially horizontal passage by which said stations can be loaded individually at the same level, means for vertically raising and lowering said stack to bring the lower plate of each station into loading position adjacent said passage, means interengaged between said plates and determining the spacing therebetween when said stations are empty, and plate supports mounted on said enclosing structure and insertable between said plates for supporting the upper plate of each station at a point above said loading position and for supporting the plates of the stack thereabove whereby each two successive plates can be separated for loading the freezing station therebetween.

16. Refrigerating apparatus comprising an enclosing structure, a vertical stack of relatively separable refrigerated plates therein providing a series of freezing stations one between each two successive plates of the stack, said enclosing structure having a substantially horizontal passage by which each station can be loaded at a common level, means engaged with the bottom plate of the stack for vertically raising and lowering the stack, supports interposed between the successive plates and maintaining the stacked plates in spaced relation when said stations are empty, and stops mounted on the enclosing structure adjacent said passage and insertable between successive plates to arrest the downward movement of the upper plate of a given station while its lower plate is lowered by said first named means to loading position, thereby separating the plates of said given station for loading, said stops supporting the stack of plates above the loading position.

17. Refrigerating apparatus comprising supporting means, a vertical stack of refrigerated plates therein providing a series of freezing stations one between each two successive plates of the stack, supports interposed between successive plates and on which the empty plates rest by gravity, whereby said empty plates are stacked in spaced relation above and are supported by the bottom plate, means engaging said bottom plate for raising and lowering the stack, said supporting means having a substantially horizontal shelf from which said stations can be loaded individually at a common level, fingers insertable between successive plates for arresting the downward movement of the upper plate of any given station at a point spaced above said loading level while the lower plate of said given station is lowered to said level by said engaging means, thereby separating said upper and lower plates and opening said given station for loading products to be frozen thereinto, said fingers being pivoted on said supporting means and swingable out of the path of raising and lowering movement of the plates in the stack after loading said given station to enable a plate to move past said fingers to index said given station out of registry with said fingers.

References Cited in the file of this patent

UNITED STATES PATENTS

| | | |
|---|---|---|
| 1,822,121 | Barry | Sept. 8, 1931 |
| 1,905,131 | Birdseye | Apr. 25, 1933 |
| 1,924,225 | Yamane | Aug. 29, 1933 |
| 2,283,923 | Hall | May 26, 1942 |
| 2,307,548 | Stone | Jan. 5, 1943 |
| 2,485,509 | Raye | Oct. 18, 1949 |
| 2,531,210 | Gilson | Nov. 21, 1950 |
| 2,578,829 | Nicholson | Dec. 18, 1951 |
| 2,608,069 | Amerio | Aug. 26, 1952 |
| 2,629,233 | Olsen | Feb. 24, 1953 |
| 2,677,943 | Nelson | May 11, 1954 |
| 2,697,920 | MacKenzie | Dec. 28, 1954 |

FOREIGN PATENTS

| | | |
|---|---|---|
| 54,577 | Netherlands | May 15, 1943 |
| 77,322 | Norway | Aug. 28, 1950 |
| 80,017 | Norway | Apr. 7, 1952 |